INVENTOR.
ROYAL H. BENSON
BY

3,560,158
METHOD FOR ANALYSIS OF LABILE HYDROGEN CONTAINING COMPOUNDS
Royal H. Benson, Texas City, Tex., assignor to Monsanto Company, St. Louis, Mo., a corporation of Delaware
Filed Aug. 12, 1965, Ser. No. 479,109
Int. Cl. G01n 23/12
U.S. Cl. 23—230                12 Claims

ABSTRACT OF THE DISCLOSURE

A method for analyzing for labile-hydrogen-containing compounds in mixtures by passing said mixture through a fixed phase of a tritium-containing substrate to effect exchange of said labile hydrogen with said tritium, detecting and measuring the radioactivity of the resulting tritium-containing compounds and using the radioactive measurement to determine the amount of the labile-hydrogen-containing compound in the mixture.

---

Figure 1:
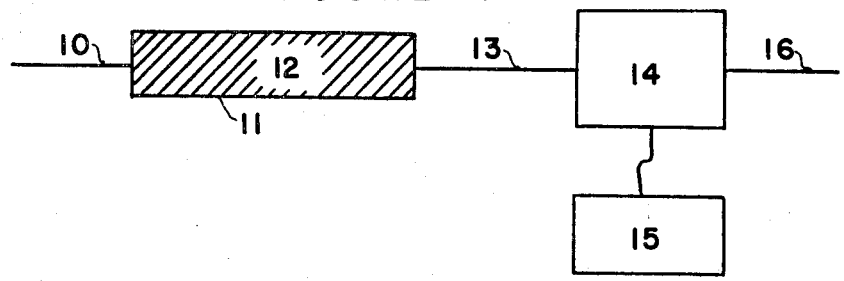

The present invention relates to an analytical method. More particularly, the present invention relates to an analytical method whereby very small amounts of certain components of mixtures may be accurately detected and measured.

One of the most useful present day analytical techniques is gas chromatography. All chromatographic methods involve distribution of the material to be separated between two phases which move counter current with respect to each other. Generally, one phase is a fixed phase while the other is a mobile phase. The fixed phase may be liquid or solid and the mobile phase gas or liquid. Gas chromatography, as the name implies, employs a gaseous mobile phase.

An inert carrier gas such as hydrogen, nitrogen, helium, etc., is used to transport the mixture to be separated through a column containing the fixed phase. Both solid and liquid fixed phases are used in gas chromatography. The fixed phase in this technique usually comprises a selective absorbent or a selective adsorbent and in some instances a combination of the two. In resolving a mixture into its components by gas chromatographic techniques, the mixture is vaporized, usually admixed with a carrier gas and passed through a long cylindrical column packed with the fixed phase of selective adsorbent and/or selective absorbent. On contacting the fixed phase, the mixture is resolved into its components which are distributed along the length of the fixed phase according to their affinity for the fixed phase, those having the greater affinity being distributed at the entry end of the column with those of decreasing affinity being distributed further down the column. The continuous passing of the carrier gas over the fixed phase results in the components being eluted one after another from the column in the order of their distribution through the column. As each component is eluted from the column, it is detected and measured, such as by continuously measuring the thermal conductivity of the effluent from the column.

Through the present chromatographic analysis techniques such as that above described are adequate for most purposes, they are not always adequate when the detection and measurement of very small amounts of components of mixtures is desired. Also, in many instances, present chromatographic techniques are often unable to resolve all components of a mixture and two components may appear as one in the final analysis of the mixture.

It is an object of the present invention to provide a new and improved analytical method. Another object of the present invention is to provide a new and improved analytical method whereby certain components present in mixtures in very small amounts may be quantitatively detected and measured. It is also an object of the present invention to provide a new and improved analytical method whereby certain components present in mixtures in very small amounts may be quantitatively detected and measured. It is also an object of the present invention to provide a new and improved analytical method whereby certain components present in mixtures may be more accurately detected and measured. Additional objects will become apparent from the following description of the invention herein described.

The present invention which fulfills these and other objects comprises an analytical method whereby compounds containing labile hydrogen or compounds or elements which are convertible to compounds containing labile hydrogen can be detected and measured with substantial accuracy when present in mixtures even in extremely low concentrations. In one of its embodiments, the present invention is an analytical method for detecting and measuring the presence of labile hydrogen containing compounds in mixtures which method comprises exchanging said labile hydrogen in said compounds in mixtures which method comprises exchanging said labile hydrogen in said compounds with radioactive tritium, detecting and measuring the radioactivity of the resulting tritium containing compound, said detection and measurement being directly referable to said labile hydrogen containing compounds initially present in said mixture.

In another embodiment, the present invention is an analytical method for detecting and measuring the quantity of components convertible to compounds having labile hydrogen atoms in mixtures which comprises subjecting said mixtures to means for converting said components to compounds containing labile hydrogen atoms, exchanging said labile hydrogen atoms of said resulting labile hydrogen atom containing compounds with radioactive tritium and detecting and measuring the radioactivity of the resulting tritium containing compounds, which detection and measurement is directly referable to the components initially present in said mixture convertible to labile hydrogen containing compounds.

In still another embodiment of the persent invention, the present analytical technique comprises first resolving a mixture containing labile hydrogen containing compounds and/or components convertible to labile hydrogen containing compounds into its components and then detecting and measuring these components as described in reference to the above embodiments of the present invention.

The present invention represents a very substantial improvement in the analysis of mixtures. The present analytical technique provides for detection of quantities of materials beyond the lower limits of present chromatographic means. Further, the persent analytical technique provides for greater accuracy in the quantitative measurement of certain components of mixtures particularly when such components are present in extremely small quantities. Also, components not resolvable one from another by ordinary chromatographic techniques may be effectively resolved and measured when one of the components is one having labile hydrogen atoms or convertible to such a compound and the other is not.

In addition to the aforementioned advantages resulting from the present invention, it should be noted that the analytical technique disclosed herein provides an advantageous means of preparing tritium containing compounds. Tritium compounds are quite useful as radioactive tracers for leak determination in pipelines and other enclosed vessels as well as in other applications. When labile hydrogen containing compounds are passed over the fixed bed of tritium containing substrate as described below, tritium containing compounds are readily formed with good conversion and yields.

The present invention is further described by reference to the accompanying drawings. Each of the figures represents a schematic flow diagram of different embodiments of the present invention. In the drawings the same reference characters are used in each drawing to denote the same segments of the present invention.

Referring first to FIG. 1, a mixture containing at least one compound having labile hydrogen atoms is passed either in the liquid or gaseous phase, though preferably in the gaseous phase, by means of line 10 into exchange column 11 which is packed with a fixed phase 12, hereinafter referred to as a substrate. This substrate 12 is one containing exchangeable tritium. As the mixture passes through column 11 and over substrate 12, the compounds in the mixture which contain labile hydrogen exchange their labile hydrogen for the tritium of substrate 12 until an exchange equilibrium is reached. The mixture now containing tritium containing compounds passes from column 11 by means of line 13 and through radioactivity detector 14 by means of which the radioactivity of the tritium in the mixture is measured. The type of radioactivity detectors useful in the present invention are hereinafter discussed. By measuring the radioactivity of the mixture, the amount of tritium, which has a known amount of radioactivity per unit of weight, can be determined. By determining the amount of tritium passing from column 11, the concentration of the tritium containing compounds, which initially were the compounds containing labile hydrogen, can be obtained. In practical usage the radioactivity response of detector 14 will most often be transmitted to a recorder 15 where it is continuously recorded in a desired form. The tritium containing components pass from radioactivity detector 14 by means of line 16. The particular embodiment of the present invention illustrated by FIG. 1 is particularly useful wherein the analysis is either for the total concentration of labile hydrogen containing compounds in the mixture or for the detection and determination of the amount of a labile hydrogen containing compound in a mixture when only one of such compounds is present in said mixture. If two or more labile hydrogen containing compounds are present in the mixture and it is desired to detect and measure the amounts of each of these separately, the embodiment of the present invention described in relation to FIG. 2 is most often used.

Figure 2:
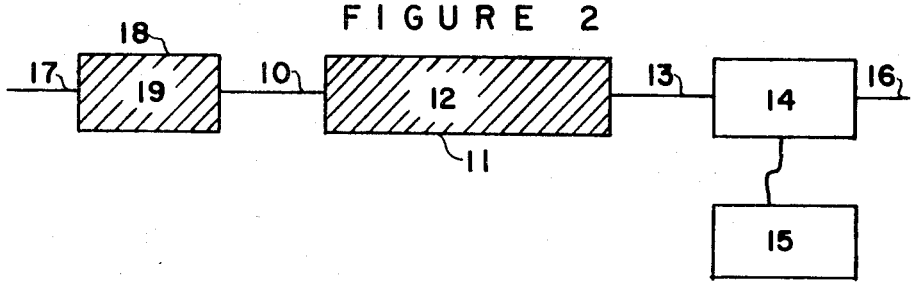

With particular reference to FIG. 2, a mixture containing two or more different compounds having labile hydrogen atoms is resolved into its components by introducing the mixture via line 17 into a separating column 18 in which means are provided for separating the mixture into its components. Each component having labile hydrogen atoms then passes separately from any other compound having labile hydrogen atoms from separatory column 18 by means of line 10 into exchange column 11 wherein the labile hydrogen atoms are exchanged for tritium and the radioactivity of the resulting tritium containing components subsequently detected and measured as described above in reference to FIG. 1.

Again, referring to FIG. 2, the means provided in separating column 18 for resolving the mixture into its components include any means whereby the mixture may be separated into its components or at least the compounds containing labile hydrogen atoms may be separated one from another. Such separation methods as selective adsorption, selective absorption or combinations of these are usually favored, though other techniques such as fractionation, diffusion through permeable membranes and the like may be used. The mixture may be separated in the vapor or the liquid state. As a practical matter, the separation means most often takes the form of a conventional chromatographic column operated according to conventional gas chromatographic techniques. In such gas chromatographic techniques, a long column, usually of ⅛ to 1 inch diameter and one to one hundred feet and more of length, is packed with a suitable fixed phase of material for separating the mixture to be separated. The mixture to be separated is generally vaporized, admixed with an inert carrier gas and introduced into the chromatographic column and passed over the fixed phase which selectively distributes the components of the mixture along its length. Those components of the mixture having least affinity for the fixed phase are swept from the chromatographic column first by the carrier gas followed by the other components in the order of their affinity for the substrate. Depending upon selection of the proper fixed phase and conditions, efficient separation of mixtures is obtained by this technique.

Particularly useful as fixed phases in separating mixtures in separatory column 18 by conventional gas chromatographic techniques are such selective absorbents as activated carbon, silica gel, alumina, silica-alumina, molecular sieves, etc., and such selective absorbents as dimethylformamide, dimethylsulfolane, diglycerols, polyglycols, etc., either supported or unsupported. When supported, the selective absorbent is usually dispersed as a relatively thin film on an inert support material such as diatomaceous earth, crushed insulating bricks, glass beads, etc., or on the walls of the column itself. The particular selective adsorbent or absorbent used will depend, of course, upon the particular separation to be made and the conditions of temperature and pressure at which the separation is to be made. The considerations for determining the best materials for use in a given separation by conventional chromatographic techniques are well known and those skilled in the art will find no difficulty in determining the particular fixed phase best suited for separating a particular mixture in separating column 18, prior to passing the components of the mixture into exchange column 11.

Figure 3:
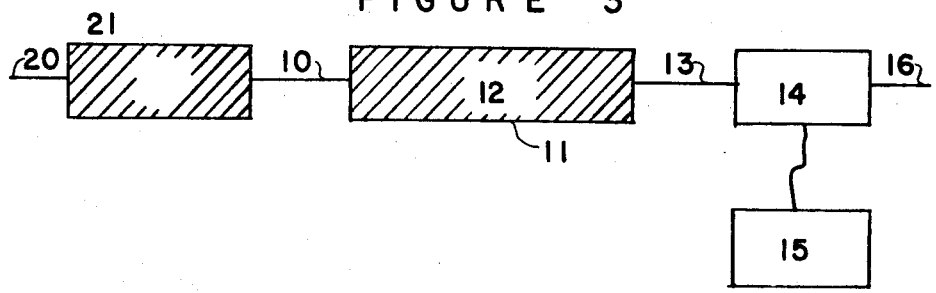

Referring now to FIG. 3, an embodiment of the present invention is presented which is particularly useful in the detection of compounds which do not contain labile hydrogen atoms but which compounds may be converted by chemical or physical means to compounds which do contain labile hydrogen atoms when such compounds are in admixture with other compounds. In this embodiment, the mixture is passed by means of line 20 into a conversion chamber 21. This conversion chamber may be of any type which will cause conversion of certain components of the mixture to compounds having labile hydrogen atoms, either by chemical or physical conversion means. The conversion chamber, of course, should be one which is sufficiently efficient to produce substantially quantitative or at least consistently reproduceable conversion of those compounds which do not contain labile hydrogen atoms to compounds having labile hydrogen atoms. The resulting conversion products exit conversion chamber 21 and pass by means of line 10 into exchange column 11 and over substrate 12 by means of which the labile hydrogen atoms in the conversion products are exchanged for tritium and detected and measured as described above in reference to FIG. 1. If two or more compounds convertible to compounds having labile hydrogen atoms are present in the mixture or if compounds having labile hydrogen atoms and compounds convertible to compounds having labile hydrogen atoms are both present in the initial mixture, and detection and measurement of each of these compounds is desired, it is usually necessary to first resolve the mixture into its components as described in reference to FIG. 2 and then pass the components through conversion chamber 21 individually.

The means by which compounds which do not contain labile hydrogen atoms may be converted to other compounds which do contain labile or active hydrogen atoms may be any of the conventional conversion processes either chemical or physical, which will produce labile hydrogen containing compounds from these compounds. The simplest and most useful of these methods, particularly when the convertible compound is a hydrocarbon, hydrogen or oxygen, is combustion, which produces water, which contains labile hydrogen, as one of the combustion products. It is, of course, necessary for accurate determination that the combustion or conversion method be one which produces a quantitative conversion or at least a conversion of known and reproducible efficiency of the convertible compounds to compounds containing labile hydrogen atoms.

The present analytical method is based upon the exchangability of labile hydrogen of compounds with tritium which is a radioactive hydrogen isotope of mass number 3. When a labile tritium containing composition comes in contact with compounds containing labile hydrogen atoms, there is a rapid exchange of the labile hydrogen atoms with tritium atoms until an exchange equilibrium is reached. The radioactivity of the tritium is readily measurable while that of the labile hydrogen is not. However, the radioactivity of the tritium is not such as to produce a radiation hazard though the beta particles emitted from tritium may be detected with high sensitivity. The radiation of the tritium compounds may be measured by conventional means for measuring radioactivity, such as Geiger counters, proportional counters, scintillation counters, ion collection chambers, and the like. Preferably, for greater sensitivity, the radioactivity of the tritium compounds is measured by means of scintillation counters or ion collection chambers, usually the latter means being preferred over the former.

As noted above, when a labile hydrogen containing compound is brought into contact with a labile tritium containing source, there is a rapid exchange of the labile hydrogen atoms of the compound with labile tritium atoms until an exchange equilibrium is reached. Because of the exchange equilibrium, the exchange of labile hydrogen for tritium is usually not sufficiently quantitative to allow accurate determination of the amount of labile hydrogen initially present in the labile hydrogen containing compound unless at least a 5:1 molar ratio of tritium in the tritium source to labile hydrogen in the labile hydrogen containing compound is used. For best results and for a high degree of accuracy, it is usually desired to have a molar ratio of available tritium in the tritium source to labile hydrogen in the compounds to be exchanged of 10:1.

In the present analytical method, the source of the tritium is generally a tritium containing fixed phase or substrate with which the labile hydrogen containing compounds are contacted. This tritium containing substrate is conveniently prepared by merely bringing tritium containing water into contact with a material possessing the characteristics of, (1) a vapor pressure sufficiently low that it will not be vaporized to any significant extent under the conditions of the operation of the present analytical technique, (2) a high decomposition temperature such that there will be no decomposition during use, (3) containing labile hydrogen atoms, and (4) a structure relatively stable to the radiation emitted by tritium. The contact between the tritium water and the substrate results in the exchange of labile hydrogen of the substrate with the tritium of the tritium water. The contacting of the tritium water and the substrate may be accomplished as simply as merely mixing the two in a flask and then separating the excess materials and products. This method is not particularly recommended, however, since a vast excessive of tritium water or numerous successive contacting stages are necessary in order to obtain relatively complete exchange of the labile hydrogen of the substrate with tritium. A second and a more preferred method of preparing the tritium containing substrate comprises placing the labile hydrogen containing substrate material in a column, preferably the same column in which it will be used in the present analytical technique and then passing vaporized tritium containing water through the column until the labile hydrogen of the substrate has been exchanged with tritium to the fullest extent possible. In this latter preferred method of preparation of the tritium containing substrate of the present invention, substantially all of the labile hydrogen of the substrate material may be exchanged for tritium.

In addition to the use of a tritium containing substrate as above described, the labile hydrogen of the compound to be detected and measured may be exchanged for tritium by countercurrent or cocurrent contact with tritium containing compounds such as tritium water. However, these types of contacting do not lend themselves well to analytical techniques because of physical problems of separating the compound to be detected from exchanged original tritium compounds and the like. Also, more complicated equipment would be necessary for such contacting. For these reasons, the present invention prefers the use of a fixed phase or substrate containing tritium, as above discussed.

As above noted, certain criteria must be met by the substrate materials from which the tritium containing substrates of the present invention are obtained. They must be of sufficiently high vapor pressure as not to be evaporated from the exchange column under the particular temperature and pressure conditions used. Also, the substrate material must be one which has a decomposition temperature such that the substrate will not decompose during contact with the mixture to be analyzed and it should not be readily decomposed by radiation. A further desirable characteristic of the substrate material is that it should be one which does not lose tritium other than by the exchange reaction with the compounds to be detected and measured. Some materials otherwise suitable for substrates for the exchange column in the present invention "leak" tritium both during contact with the mixture to be analyzed and during periods in which no mixture other than a carrier gas is in contact with the substrates. For example, when polyhydroxy compounds are used as a substrate, interaction between the molecules of the substrate will very often split out tritium water which may continuously leak from the substrate. The leakage of this tritium both depletes the activity of the substrate and second, it introduces error into the measurement and detection of the exchanged compounds in the mixture which is to be analyzed. Another necessary criteria for the substrate is that it be a compound which contains labile hydrogen atoms. Among the substrate materials suitable for preparing the tritium containing substrates useful for detecting labile hydrogen containing compounds in accordance with the present invention are those having a substituents hydroxyl, amine, amide, or other groups having labile hydrogen atoms attached thereto. Nonlimiting examples of such compounds are relatively high boiling alcohols, preferably the mono-hydroxy alcohols such as decanol, dodecanol and others; aromatic hydroxy compounds such as phenols, naphthols and the like; organic acids such as oxalic acid, dodecanoic acid, tridecanoic acid, sulfonic acid, etc.; inorganic hydroxides such as calcium hydroxide, sodium hydroxide, barium hydroxide; polymeric aromatic amines, polymeric aromatic amides, sulfonamides, etc.; benzimidazole polymers, and the like. The preferred substrate materials are polybenzimidazole polymers or polymeric aromatic amides.

The materials which may be detected and quantitatively measured by the analytical technique of the present invention may be divided into two classes. The first class includes those compounds which contain labile or active hydrogen atoms. This includes water, alcohols, amines, amides, acids, and the like. Several nonlimiting examples of such compounds are water, methanol, ethanol, propanol, butanol, benzylamine, formamide, dimethylformamide, acetamide, propanamide, acetic acid, formic acid, hydrochloric acid, sulfuric acid, phosphoric acid, hydrobromic acid, etc. The second class of materials detectable and measurable by the present invention include compounds and elements which do not contain labile or active hydrogen atoms and are thus not directly detectable or measurable, but which may be suitable conversion means produce compounds having labile or active hydrogen which are detectable or measurable. This latter class of compounds or elements includes particularly hydrocarbons, oxygen, hydrogen, the halogens, carbon dioxide and many other compounds which by chemical reaction with other elements or compounds yield labile hydrogen containing compounds. Hydrocarbons themselves do not contain labile hydrogen atoms, but may be quantitatively converted to $H_2O$ and $CO_2$ by combustion. Hydrogen may be converted to $H_2O$ in the presence of oxygen while oxygen may be converted to water by reduction in the presence of hydrogen. The $H_2O$ obtained then may be detected and measured by the process of the present invention. By detecting and measuring the amounts of water, the presence and amount of hydrocarbons, hydrogen or oxygen may be obtained along with, in the case of hydrocarbons, a reasonably accurate qualitative determination of the particular hydrocarbon. The qualitative determination of hydrocarbons, of course, must be based on the number of moles of water obtainable from combustion of particular hydrocarbons. The halogens may be determined by conversion to the corresponding acids which may be then detected and measured in accordance with the present invention. Such compounds as carbon dioxide may be determined by reaction with such materials as calcium hydroxide which results in water as a byproduct of the reaction. The water, of course, may be readily detected and measured by the present technique and is referable back to the carbon dioxide. Though compounds of virtually any molecular weight may be detected and measured by the present analytical method, it is most useful in the analysis of mixtures which are vaporizable at practical temperatures. Ordinarily, these mixtures are vaporizable at temperatures below 1000° C.

The analytical techniques of the present invention is generally carried out with the mixture in a fluid state. Preferably, the mixture is passed into contact with the tritium containing substrate in the gaseous state.

In practicing the present analytical technique by passing the mixture to be analyzed in a gaseous state over the tritium containing substrate, a carrier gas is generally used to sweep the mixture sample into, through and out of the exchange column and through the radioactivity detector. Any of the conventional carrier gases used in gas chromatography may be used as a carrier gas in the present invention. Of course, the carrier gas used should be one which does not contain any labile hydrogen atoms. Among these are such carrier gases as hydrogen, helium, nitrogen, argon, carbon dioxide, methane, ethane, propane, butane, and the like. Preferably, nitrogen, helium, argon or ethane are used as carrier gases in practicing the present invention. Many of the carrier gases used for passing the mixture through the exchange column may also be used in carrying the mixture through a separatory column and/or a conversion chamber if used. Hydrocarbon carrier gases are, of course, usually avoided for carrying the mixture through a conversion chamber.

Though the present analytical technique is useful in detecting and measuring any concentration of labile hydrogen containing compounds in mixtures, it is most useful in detecting and measuring concentrations of labile hydrogen containing compounds when they are present in mixtures in concentrations below those detectable and measurable by present gas chromatographic techniques. Also, the present invention is often quite useful in detecting and measuring compounds which though present in measurable quantities cannot be detected because of failure of present chromatographic techniques to adequately separate such compounds from a compound closely related in properties.

The operating conditions for the present analytical method may vary over a relatively wide range. Generally, temeprature and pressure are adjusted in a manner to provide for flow through the exchange column and to maintain the mixture being analyzed in the vapor state. Usually the temperature of operation is within the range of from ambient temperatures (20 to 40° C.) to as high as 700° C. Pressures may range from subatmospheric pressure to as high as 100 p.s.i.g. and higher. Reduced pressures may be used in order to reduce the temperature necessary to maintain a vapor phase as well as to provide rapid flow of the mixture to be analyzed through the exchange column. The residence time of the mixture in the exchange column in contact with tritium containing substrate may be very short. The exchange reaction between the tritium of the substrate and labile hydrogen of the compounds containing same is very rapid. Residence times of as low as 0.01 second have been found sufficient for a 99.9 percent complete exchange of tritium for labile hydrogen.

In the most useful embodiment of the present analytical technique, the exchange column is constructed with a nonadsorptive inner surface. When the present invention is used for analyzing for extremely small quantities of compounds containing labile hydrogen, adsorption of the components in the system by the exchange column inner surfaces may significantly reduce the sensitivity of the analytical technique. Thus, the inner surfaces of the exchange column should be nonadsorptive to the labile hydrogen or tritium containing components of the system. A particularly useful material of construction of the exchange tube is pure platinum. In addition other pure heavy metals may be used in the exchange column such as gold, rhodium or iridium. Also, polytetrafluoroethylene is a useful material of construction for the exchange column.

Adsorption of the tritium containing compounds exiting the exchange column may also occur in the flow lines connecting the exchange column and the radioactivity detector as well as in the radioactivity detector itself. Again, when the amount of these adsorbable compounds in the system is extremely small, appreciable error may be introduced by this adsorption. The adsorption of the tritium containing compounds may be alleviated by the use of nonadsorptive surfaces within the flow lines and the radioactivity detection chamber. However, a more useful and less expensive means of overcoming the adsorption of the tritium containing compounds comprises introducing a labile hydrogen containing purge material in comparatively large quantities into the flow line between the exchange column and the radioactivity detector immediately downstream from the exchange column. Dilution of the tritium containing effluent from the exchange column with the large quantities of labile hydrogen containing purge material substantially reduces the amount of tritium containing compound adsorbed since the labile hydrogen containing material is adsorbed with equal facility with the tritium containing effluent. The choice of the particular purge material may vary to some extent with reference to the particular tritium containing compound. Preferably, it is one that is readily vaporizable such as for example methanol, ethanol, ammonia, methyl amine, or water. The quantity of purge material used is usually rather large with regard to the amount of tritium containing compound in the effluent. The larger the amount of purge material, the less tritium compound will be adsorbed.

To further assist in the understanding of the present invention the following specific examples of its operation is presented. This example is in no manner to be construed as limiting the present invention.

EXAMPLE

A tritium containing substrate was prepared as follows:
A 308-milligram sample of a polybenzimidazole polymer of 80–100 mesh size particles prepared from diphenyl isophthalate and 3-3'-diaminobenzidene was packed into a length of 1/8″ O.D. 0.005-inch wall thickness platinum tubing. This sample contained exchangeable hydrogen equivalent to one millimole of water. The platinum tubing was connected at its exit end to an ion-chamber for the detection and measurement of radioactivity in the gases exiting the tubing. The ion-chamber was in turn electrically connected to an electrometer and a strip chart recorder in order that radioactivity detected by the ion-chamber could be recorded and measured on a strip chart. Predried ethane was then passed over the substrate at the rate of 100 ml./min. for 24 hours at 300° C. to remove traces of impurities and volatile materials from the substrate. The temperature of the substrate was then reduced to 175° C. and 36 milligrams (2.0 millimoles) of tritiated water having a specific activity of one curie per millomole was introduced into contact with the substrate at a constant rate over a 24-hour period. After the introduction of the tritiated water, the substrate was maintained at the temperature of 175° C. for an additional period of 24 hours under a mild ethane flow in order to allow the substrate to become stabilized.

The system sensitivity for labile hydrogen detection and measurement was determined by injecting into contact with the substrate one microliter of hexane containing 4 p.p.m. of water. The response of the ion-chamber to the effluent from the substrate was then recorded on the strip chart, as a peak indicating 220 millivolts. The sensitivity was thus obtained as .0182 p.p.m. water per millivolt.

1 microliter of a hydrocarbon sample comprised of toluene and containing an estimated amount of water of less than 100 p.p.m. was vaporized and passed through the platinum tubing and over the tritium containing polybenzimidazole substrate in admixture with pre-dried ethane as a carrier gas. The flow rate of the carrier gas was 100 ml./min. The temperature within the column was 175° C. A methanol purge gas was introduced into the effluent from the platinum exchange column at the rate of 10 ml./min. The effluent from the platinum column then passed into the ion-chamber from which it was vented. Radioactivity of the effluent was measured during passage through the ion-chamber and recorded on the strip chart of the recorder, as a peak indicating 3960 millivolts. The amount of water in the hydrocarbon sample, from the sensitivity of .0182 p.p.m./mv., was determined to be 72 p.p.m. which was the actual amount of water present.

What is claimed is:

1. An analytical method for detecting and measuring the presence of labile hydrogen containing compounds in mixtures which comprises passing said mixture through a fixed phase of a tritium containing substrate thereby causing the labile hydrogen of compounds containing same to be exchanged with tritium of said substrate, detecting and measuring the radioactivity of the resulting tritium containing compound, said detection and measurement being directly referable to said labile hydrogen containing compounds initially present in said mixture.

2. The method of claim 1 wherein the labile hydrogen containing compounds are selected from the group consisting of water, alcohols, acids, amines and amides.

3. The method of claim 1 wherein said mixture is passed through said fixed phase of said tritium containing substrate while in the gaseous state.

4. The method of claim 1 wherein said mixture is separated into its components before being passed through said fixed phase of said substrate and the components then passed over the substrate individually.

5. The method of claim 1 wherein said substrate is one selected from the group consisting of high boiling alcohols, aromatic hydroxy compounds, organic acids, inorganic hydroxides, polymeric aromatic amines, polymeric aromatic amides and polysulfonamides.

6. The method of claim 5 wherein said substrate is a polymeric aromatic amide.

7. The method of claim 6 wherein said substrate is a polybenzimidozole polymer.

8. An analytical method for detecting and measuring the quantity of components convertible to compounds having labile hydrogen atoms which comprises subjecting said mixture to a means for converting said components to compounds having labile hydrogen atoms, passing said compounds having labile hydrogen atoms through a fixed phase of a labile tritium containing substrate, thereby exchanging said labile hydrogen atoms of said resulting labile hydrogen atom containing compounds with radioactive tritium and detecting and measuring the radioactivity of the resulting tritium containing compounds, which detection and measurement is directly referable to the components initially present in said mixture convertible to labile hydrogen containing compounds.

9. The method of claim 8 wherein said components convertible to a compound having labile hydrogen atoms is one selected from the group consisting of hydrocarbons, hydrogen and oxygen.

10. The method of claim 8 wherein said mixture is passed through said fixed phase of said tritium containing substrate while in the gaseous state.

11. The method of claim 8 wherein said mixture is separated into its components before being subjected to said means for converting said components convertible to labile hydrogen containing compounds and said components then subjected to said means for conversion individually.

12. The method of claim 8 wherein said substrate is one selected from the group consisting of high boiling alcohols, aromatic hydroxy compounds, organic acids, inorganic hydroxides, polymeric aromatic amines, polymeric aromatic amides and polysulfonamides.

References Cited

UNITED STATES PATENTS 3,091,689   5/1963   Spacil _____ 250—106

OTHER REFERENCES

Eastham, J. F., et al.: Analytical Chemistry, vol. 31, pp. 555–8 (1959).

Nucleonics, vol. 16, pp. 62–67 (March 1958).

MORRIS O. WOLK, Primary Examiner

E. A. KATZ, Assistant Examiner

U.S. Cl. X.R.

23—232; 250—106